United States Patent [19]
Lakota

[11] 3,784,896
[45] Jan. 8, 1974

[54] EQUIPMENT FOR THE AUTOMATIC RESYNCHRONIZATION OF A SYNCHRONOUS GENERATOR

[75] Inventor: Josip Lakota, Luzern, Switzerland

[73] Assignee: Aktiengesellschaft Brown Boveri & Cie, Baden, Switzerland

[22] Filed: Dec. 22, 1972

[21] Appl. No.: 317,766

Related U.S. Application Data

[63] Continuation of Ser. No. 134,741, April 16, 1971, abandoned.

[30] Foreign Application Priority Data
April 20, 1970 Switzerland.....................5853/70

[52] U.S. Cl...................... 322/20, 318/167, 322/24
[51] Int. Cl. ............................................ H02p 9/44
[58] Field of Search .................. 322/19, 20, 23, 24, 322/28, 59; 318/167

[56] References Cited
UNITED STATES PATENTS

| | | | |
|---|---|---|---|
| 3,582,735 | 6/1971 | Maruschak | 318/167 |
| 3,440,509 | 4/1969 | Tomeo et al | 318/167 |
| 2,215,312 | 9/1940 | Alexanderson | 318/167 |

*Primary Examiner*—James D. Trammell
*Attorney*—Eugene J. Roberts et al.

[57] ABSTRACT

Apparatus for effecting automatic resynchronization of a synchronous generator in the event that it falls out of synchronism includes a stabilization circuit which produces an output signal that correspondingly influences the excitation voltage whenever the slip lies within a range determined by a given relationship between the rated frequency of the generator, the inertia constant of the machine group that includes the generator and the maximum value of the synchronous moment.

4 Claims, 1 Drawing Figure

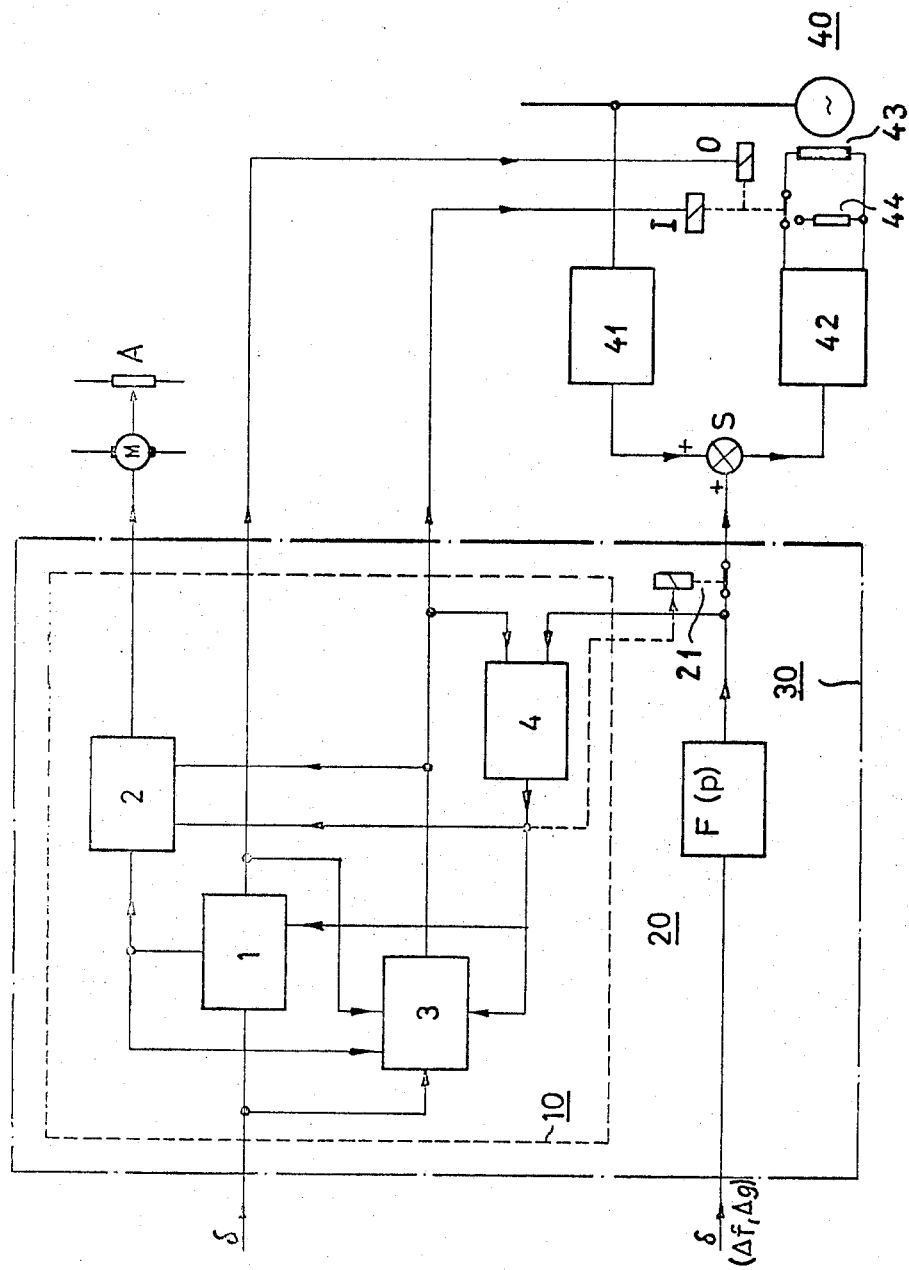

EQUIPMENT FOR THE AUTOMATIC RESYNCHRONIZATION OF A SYNCHRONOUS GENERATOR

This is a continuation of application Ser. No. 134,741, filed Apr. 16, 1971, now abandoned.

This invention relates to an improved device for automatically resynchronizing a synchronous generator by modifying the excitation voltage.

Asychronous operation of synchronous alternators can develop mainly for the following reasons:
a. loss of excitation,
b. loss of transient stability after a serious disturbance, such as a short circuit,
c. loss of steady state stability of the severely overloaded generator (in under-excited operation) during a small disturbance.

In case (a), the generator functions as an asynchronous machine. In the cases (b) and (c), the generator furnishes when energized, in addition to asynchronous output, also a pulsating synchronous output, i.e. an output proportional to the excitation current.

For a long time, asynchronous operation was considered inadmissible, and the generator out of step was immediately disconnected from the network. But various studies and experience have shown that in many cases, especially where turbogenerators (steam turbine generators) are involved, asynchronous operation presents no great danger. This is the case particularly when the machine is de-energized after synchronism is lost, thereby diminishing the electrical and mechanical strains on the machine, the voltage, reactive and active output fluctuations. But for this the machine must take its magnetization power from the network which may cause a voltage reduction in the adjacent part of the system. This entails the danger of other machines falling out of step. This danger is smaller in today's networks in which all machines have automatic voltage regulation and the possibility of ceiling excitation. An answer to the question whether or not, in a concrete case, asynchronous operation is admissible requires consideration of strains on the machine itself, consideration of behavior of other machines, and the control of operation of the protective relays and the conditions for the consumers and auxiliaries.

If asynchronous operation is admissible, the machine should be re-synchronized without disconnecting it from the network. In this manner, the machine supplies, during its asychronous operation, an active power to the network, usually great in the case of turbogenerators. In case (a), which will not be discussed here in detail, re-synchronization is possible only with the intervention of the operating personnel, whereas an automatic re-synchronization is possible in case (b). In case (c) it is expedient to prevent the loss of steady state stability. This case too, will not be discussed here so that the following considerations relate only to the case of automatic re-synchronization.

It is known that an un-energized synchronous machine running asynchronously can be brought back into synchronism when the excitation is turned on at a sufficiently small slip. But in doing this, it is just as easily possible that the machine after reaching synchronous speed, reverts back into asynchronous operation. Therefore, such a re-synchronization is more or less a matter of chance.

A solution which should assure automatic re-synchronization in any event is described in:
1. Automatic re-synchronization of synchronous machines. O. P. Malik, B. J. Cory. Proceedings IEE, Vol. 113, December, 1966.
2. Study of asynchronous operation and re-synchronization of synchronous machines by mathematical models. O. P. Malik, B. J. Cory, Proceedings IEE, Vol. 113, December, 1966.

In the second mentioned publication, it is shown that a reliable re-synchronization can be achieved in that the excitation for the pole windings on the rotor is switched on in a certain magnitude, at a certain slip and at a certain rotor angle. Depending upon the operating conditions, each case of re-synchronization requires individual values. Any solution with fixed values thus is a compromise, and there are circumstances under which re-synchronization does not succeed. Therefore, a calculator is provided in (1) which should contain a mathematical model of the machine. Based on the measurement of the operating conditions, the required values (rotor angle, slip, excitation voltage) for each case of failure are then to be calculated for the insertion of the excitation.

It is the objective of the invention to indicate a simpler and less expensive arrangement for automatic re-synchronization, yielding better results than the arrangement known heretofore. This is accomplished for an arrangement described at the outset in that a stabilizing circuit is employed to influence the excitation in asynchronous operation for a slip value $s_k$ of the generator in the range:

$$|s_k| \leq \sqrt{2 \cdot M_{s\,max}/\omega_n \cdot T_A}$$

$\omega_n = 2\pi f_n; f_n =$ rated frequency
$T_A =$ inertia constant of the machine group
$M_{s\,max} =$ the maximum value of the synchronous moment.

The excitation of the synchronous machine in asynchronous operation is influenced by this stabilizing circuit at sufficiently small slip through the stabilizing signals such as slip and acceleration (or equivalent signals). Since these signals, superposed to the excitation, act in the sense of bringing slip and acceleration to zero, re-synchronization is achieved, regardless of the rotor angle at the moment of the insertion of the excitation, provided the slip at that moment was small enough and the conditions for stationary operation are met (the steady state stability limit is not exceeded).

The mean slip value $s_k$, at which, when fallen below, the excitation should be inserted, corresponds to the value at which, due to the insertion of the excitation, the momentary slip value can be brought back to zero. It can be demonstrated that this value is defined by:

$$|s_k| \leq \sqrt{2 \cdot M_{s\,max}/\omega_n \cdot T_A}$$

$\omega_n = 2\pi f_n; f_n =$ rated frequency.
$T_A =$ inertia constant of the group.
$M_{s\,max} =$ the maximum value of the synchronous moment.

$M_{s\,max}$ is determined by the maximum excitation of the machine, its synchronous reactances, coupling reactance to the network and network voltage. The maximum excitation corresponds to the ceiling excitation for the case where the stabilizing signal contains only the slip influence. It may be slightly smaller than the ceiling excitation when the stabilizing signal also contains the acceleration besides the slip.

One implementation example of the invention is explained in greater detail below and by way of the attached drawings wherein:

FIG. 1 is a block schematic diagram of the implementation example described.

The arrangement according to FIG. 1 of the drawing contains a logic circuit 10 and a stabilization circuit 20. Both arrangements together form the equipment 30 for the re-synchronization of a synchronous generator 40. The logic circuit 10 consists of an arrangement 1 for detection of an asynchronous operation based on the signal received by its input and proportional to the rotor angle δ, and for the emission of a control signal 0 for disconnecting the excitation voltage. The number of slip periods is counted here also. Further connected to an output terminal of this arrangement 1 is a device 2 for decreasing the turbine power output by influencing the reference signal A of the turbine regulator. A circuit 3, connected to both the input of the logic circuit 10 and the output of the arrangement 1, takes over the measurement of the slip and controls, by means of an insertion signal I, the insertion of the excitation voltage after the slip has fallen below a set value. Finally there is provided in the logic circuit 10 a device 4 for the return to zero (i.e. reset) of all other circuit components and, through a switch 21, the eventual disconnection of the stabilization circuit 20 after the effected re-synchronization.

The required stabilization signals are derived in the stabilization circuit 20, by means of a transfer function $F(p)$, from the rotor angle δ, or from the difference $\Delta f$ between the frequency of the internal e.m.f. and the frequency of the generator terminal voltage, or from the deviation $\Delta g$ of the shaft speed and summed with the output of the voltage regulator 41 in a summer S. Output of summer S influences the excitation of generator field 43 by controlling the power stage 42.

The equipment operates in the following manner.

After loss of synchronism, the excitation is automatically switched off by the arrangement 1 and the rotor shortcircuited through a resistor 44 indicated in the drawing. If, after a certain number of slip periods the mean slip value is now smaller than $s_k$, the excitation is switched on by the device 3. If the mean slip value is greater than $s_k$, the device 2 gives the commands to reduce the turbine power output by decreasing the reference value A of turbine regulator until the $s_k$ value is fallen below. Simultaneous with the insertion of the excitation a further reduction of the turbine power output is prevented. After the insertion of the excitation, the excitation voltage is automatically influenced by the stabilization circuit 20 so that both slip and acceleration are brought back to zero in the shortest period of time which means that the machine is safely resynchronized. After resynchronization is effected, the arrangements 1, 2, 3 are returned into their initial position by the device 4. If desired, the stabilization circuit 20, too, may be disconnected by the same device 4 by means of switch 21.

The arrangement described makes it possible for the machine to be resynchronized automatically in any event, and not merely accidentally, in the shortest period of time and with the greatest possible output, without disconnection from the network. This saves the great losses otherwise caused by the breakdown of the machine.

In addition, the operation of the network is favorably influenced by a smaller output failure. The arrangement is applicable generally, i.e. to steam and to water powered machines, with or without damping winding.

Instead of the calculator in the known arrangement, the arrangement described contains a stabilization circuit which is often desired or required anyway for the damping of the rotor oscillations and the expansion of the steady state stability limits in synchronous operation.

I claim:

1. The combination with a machine group comprising an alternating current generator driven by a prime mover such as a steam turbine of apparatus for effecting automatic re-synchronization of said machine group following a slip of the generator out of synchronism, said re-synchronizing apparatus including means for producing a signal proportion to generator slip, means controlled by said slip signal for disconnecting the field circuit of said generator from its source of energization, means for re-connecting said field circuit to its energizing source to re-synchronize the generator only when the slip value $s_k$ determined from a number of slip periods lies within the range:

$$|s_k| \leq \sqrt{2 \cdot M_{s\ max}/\omega_n \cdot T_A}$$ wherein $\omega_n = 2\pi f_n$; $f_n$ = rated frequency
$T_A$ = inertia constant of the machine group
$M_{s\ max}$ = maximum value of the synchronous moment means deriving a stabilization signal variable with the slip, a voltage regulator connected to and controlled by the line to which the output of said generator is connected, and a summing device receiving as inputs thereto said stabilization signal and the output from said voltage regulator and which produces therefrom an output which is connected to said source of energization for said field circuit to correspondingly control the current supplied to the field circuit subsequent to re-connection thereof.

2. The invention as defined in claim 1 wherein said stabilization signal variable with the slip is derived from the rotor angle.

3. The invention is defined in claim 1 wherein said stabilization signal variable with the slip is proportional to and derived from the difference between the frequency of the generator internal e.m.f. and the frequency of the generator terminal voltage.

4. The invention as defined in claim 1 and wherein said stabilization signal variable with the slip is proportional to and derived from the deviation in velocity of the generator shaft.

* * * * *

UNITED STATES PATENT OFFICE
CERTIFICATE OF CORRECTION

Patent No. 3,784,896          Dated January 8, 1974

Inventor(s) JOSIP LAKOTA

It is certified that error appears in the above-identified patent and that said Letters Patent are hereby corrected as shown below:

Claim 1, line 12, -

-- mean -- should be inserted before "slip"

Signed and sealed this 9th day of July 1974.

(SEAL)
Attest:

McCOY M. GIBSON, JR.        C. MARSHALL DANN
Attesting Officer          Commissioner of Patents